US011263151B2

(12) United States Patent
Campbell et al.

(10) Patent No.: US 11,263,151 B2
(45) Date of Patent: Mar. 1, 2022

(54) DYNAMIC TRANSLATION LOOKASIDE BUFFER (TLB) INVALIDATION USING VIRTUALLY TAGGED CACHE FOR LOAD/STORE OPERATIONS

(71) Applicant: INTERNATIONAL BUSINESS MACHINES CORPORATION, Armonk, NY (US)

(72) Inventors: David Campbell, Austin, TX (US); Bryan Lloyd, Austin, TX (US); David A. Hrusecky, Cedar Park, TX (US); Kimberly M. Fernsler, Cedar Park, TX (US); Jeffrey A. Stuecheli, Austin, TX (US); Guy L. Guthrie, Austin, TX (US); Samuel David Kirchhoff, Austin, TX (US); Robert A. Cordes, Austin, TX (US); Michael J. Mack, Round Rock, TX (US); Brian Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/941,630

(22) Filed: Jul. 29, 2020

(65) Prior Publication Data
US 2022/0035748 A1 Feb. 3, 2022

(51) Int. Cl.
*G06F 12/00* (2006.01)
*G06F 12/1045* (2016.01)
*G06F 12/0891* (2016.01)
*G06F 9/54* (2006.01)
*G06F 9/30* (2018.01)

(52) U.S. Cl.
CPC ...... *G06F 12/1045* (2013.01); *G06F 9/30043* (2013.01); *G06F 9/30047* (2013.01); *G06F 9/546* (2013.01); *G06F 12/0891* (2013.01)

(58) Field of Classification Search
CPC ............. G06F 12/1045; G06F 9/30043; G06F 9/30047; G06F 9/546; G06F 12/0891
See application file for complete search history.

(56) References Cited

U.S. PATENT DOCUMENTS 9,405,700 B2 8/2016 Wingard
9,454,490 B2 9/2016 Siegel et al.
(Continued)

OTHER PUBLICATIONS

Authors Unknown, "An Effective Method To Invalidate Virtually Indexed Physically Tagged Instruction Cache", IPCOM000125762D, Jun. 16, 2005, pp. 1-3.
(Continued)

*Primary Examiner* — Gurtej Bansal
(74) *Attorney, Agent, or Firm* — Teddi E. Maranzano (57) ABSTRACT

Translation lookaside buffer (TLB) invalidation using virtual addresses is provided. A cache is searched for a virtual address matching the input virtual address. Based on a matching virtual address in the cache, the corresponding cache entry is invalidated. The load/store queue is searched for a set and a way corresponding to the set and the way of the invalidated cache entry. Based on an entry in the load/store queue matching the set and the way of the invalidated cache entry, the entry in the load/store queue is marked as pending. Indicating a completion of the TLB invalidate instruction is delayed until all pending entries in the load/store queues are complete.

20 Claims, 4 Drawing Sheets

(56) References Cited

U.S. PATENT DOCUMENTS

| | | |
|---|---|---|
| 10,482,028 B2 | 11/2019 | Koker et al. |
| 2006/0020759 A1* | 1/2006 | Barrick .................. G06F 9/3834 |
| | | 711/144 |
| 2013/0219128 A1* | 8/2013 | Rajagopalan ....... G06F 12/0833 |
| | | 711/146 |

OTHER PUBLICATIONS

Black, et al., "Translation Lookaside Buffer Consistency: A Software Approach", 1989 ACM 0-08971-300-0/89/0004/0113, pp. 113-122.

Disclosed Anonymously, "Extended Cache Invalidation", IPCOM000232307D, Oct. 31, 2013, pp. 1-9.

Disclosed Anonymously, "Method for Enabling Advanced Load/Validation Instructions and a Data-Speculation Validation Structure Without the Use of Snooping", IPCOM000022675D, Mar. 25, 2004, pp. 1-4.

Liu, H. et al.;"Decoupling Translation Lookaside Buffer Coherence From Cache Coherence", IEEE Computer Society Annual Symposium on VLSI (ISVLSI 2017), Jul. 2017, Bochum , Germany, 10.1109/ISVLSI.2017.25, 7 pages.

Wiggins, "A Survey on the Interaction Between Caching, Translation and Protection"., Operating Systems and Distributed Systems Group School of Computer Science and Engineering, The Univeristy of New South Wales, AU, UNSW-CSE-TR-0321, Aug. 2003, pp. 1-37.

\* cited by examiner

DYNAMIC TRANSLATION LOOKASIDE BUFFER (TLB) INVALIDATION USING VIRTUALLY TAGGED CACHE FOR LOAD/STORE OPERATIONS

BACKGROUND

Embodiments of the invention generally relate to computer systems, and more specifically, to dynamic Translation Lookaside Buffer (TLB) invalidation.

Multi-processor implementations use hardware based invalidations to invalidate cached page table entries in a TLB when software, e.g., the operating system, modifies the in-memory page table contents. The modified in-memory page tables no longer map to valid addresses. The core originating the TLB invalidation invalidates its local cache, but also broadcasts the TLB invalidation instruction to other cores in the computer because these remote cores may be executing load/store operations on the addresses that are being invalidated. Marking the load/store operations matching the set/way of the cache entry that is invalidated ensures that all load/store operations to the page being invalidated are finished before acknowledging completion of the TLB invalidate instruction to the originating core, and also ensures that the out of order requirement is satisfied.

SUMMARY

Among other things, a method is provided for translation lookaside buffer (TLB) invalidation using virtual addresses. A cache is searched for a virtual address matching the input virtual address. Based on a matching virtual address in the cache, the corresponding cache entry is invalidated. The load/store queue is searched for a set and a way corresponding to the set and the way of the invalidated cache entry. Based on an entry in the load/store queue matching the set and the way of the invalidated cache entry, the entry in the load/store queue is marked as pending. Indicating a completion of the TLB invalidate instruction is delayed until all pending entries in the load/store queues are complete Embodiments are further directed to computer systems and computer program products having substantially the same features as the above-described computer-implemented method.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

The present disclosure relates generally to the field of computing systems, and in particular to dynamic TLB invalidation using a virtually tagged cache.

In multi-processor implementations, hardware is invoked to invalidate cached TLB page table entries when software, e.g., the operating system, modifies the in-memory page table contents. The core performing the invalidation of its cached TLB entries (i.e., the originating or home core) broadcasts the TLB invalidation instruction to the remaining cores (i.e., the remote cores) in the system over the interconnect hardware fabric that connects all the cores. The virtual address of the page to be invalidated is an operand of the TLB invalidation instruction.

The remote cores may be executing load/store operations on the virtual address that is the target of the TLB invalidate instruction. These operations may be executing out of order because of how the pipeline is implemented in the architecture. Therefore, the load/store operations are marked in the load/store queue so that the core is aware of which cache entries have the invalid translation and which entries have the post-invalidate addresses. To satisfy the out of order execution requirements of the architecture, all pending load/stores may be marked. This results in overmarking, where some load/store entries are marked if there is a possibility that the virtual address is a target of the invalidation. However, overmarking has the side effect of slowing the performance of the TLB invalidation. For example, in an operating system that is architected to expect the TLB invalidation to execute in a certain period of time, the overmarking creates a backlog because the load/stores must be cleared on all the cores before the TLB invalidation on the home core can acknowledge to the hardware and to the operating system that it is complete. However, overmarking ensures that all load/store operations to the page being invalidated are finished before acknowledging completion of the TLB invalidate instruction to the originating core. This can be done by requiring that a remote core completes all its marked load/store operations before notifying the originating core that the TLB invalidate instruction is complete. The originating core can signal the completion of the TLB invalidate instruction based on a partial sum of all cores that acknowledged completion.

One current approach to ensure that the marked load/stores are finished executing is to flush the loads and drain the stores. Pending loads are flushed and re-executed. Stores that are already completed are forced to become coherent. However, computing systems may have twenty four, or more, multi-threaded cores. Requiring flushes, drains, and re-fetches generates a high volume of traffic that impacts performance. Other work in the system is delayed or suspended until the TLB invalidation is completed on all the cores, making this approach inefficient.

An alternative approach is to store the virtual address of the load/store queue entry in every load/store queue entry. The target virtual address of the TLB invalidation is compared to the virtual address in the load/store queue entry, and matches are marked. When the marked load/store operations complete, the home core is notified. While this approach results in a more precise marking, and does not impact performance as it does in flushing and draining load/store queue entries, it is cost prohibitive in terms of the power consumption needed to drive the additional memory, chips and circuitry to implement it.

In a virtual cache, i.e., a cache having virtual addresses rather than real addresses, the virtual address can be used to both invalidate the cache line and to mark the pending load/stores in the load/store queue in one operation. The TLB invalidation address is used to search the cache for a match by set and way. The set refers to the index into the cache, while the way indicates the associativity. Each set and way in the cache is searched as follows. For each set, search each way in the set. If the virtual address in the TLB invalidation instruction matches the virtual address in the set/way in the cache, then the cache set/way is invalidated. Based on the match, the load/store queue is searched for the set/way from the cache. Upon a match, the load/store queue entry is marked as pending. Therefore, the cache becomes inclusive of load/store operations, and the set/way in the load/store entry becomes a pointer to the cache line. Because the set/way comprises fewer bits than the full virtual address, the set/way is a compressed identifier of the full virtual address. The result is a precision marking. When a load/store is executed, the load/store unit (LSU) looks up the corresponding cache entry using the set/way. Using the virtual cache to mark load/store operations satisfies the ordering requirement without overmarking and without impacting performance.

When a line is evicted from the cache, a cache miss occurs and the cache is reloaded using a new set/way. The set is derived from a subset of the bits in the effective address. The way is based on a least recently used (LRU) algorithm. The new set/way is sent to the load/store queue and is searched. A match means the cache line that was being used has been overwritten. The LSU marks a bit in the load/store queue entry indicating that it was evicted. When the subsequent TLB invalidation process searches the cache, these evicted load/store operations are imprecisely marked because the virtual address in the set/way of the cache the executing instruction was originally pointing to has been replaced by a different virtual address. Therefore, the TLB invalidation search will not find the original virtual address to mark it. In this case, for load/store operations marked as evicted, only the set is matched because it remains static. The way is ignored.

Figure 1:
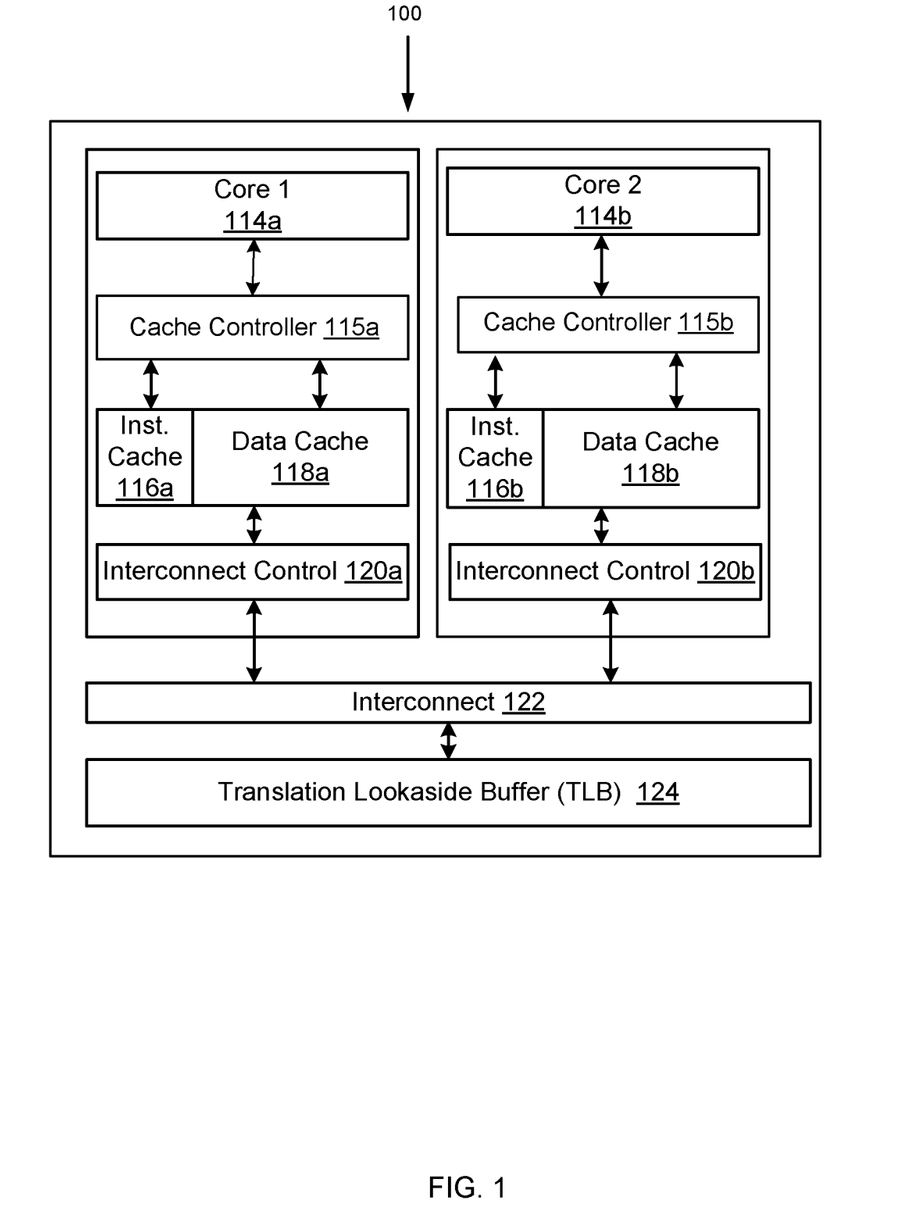
FIG. 1 depicts an example multicore processor environment, according to embodiments of the present disclosure.

FIG. 1 depicts an example multicore processor environment, according to embodiments of the present invention.

FIG. 1 shows two cores (core 1 114a, core 2 114b, etc.), but many more are possible. The cores are shown on one die 100, but other configurations are possible. The cores are connected with an interconnect 122 under management of an interconnect control 120a, 120b. The interconnect 122 is the hardware fabric over which the cores communicate with each other, such as to broadcast the TLB invalidation instruction to all cores in the system.

Each core 114a, 114b may have a split cache that is local to the core. The cache consists of an instruction cache 116a, 116b and a data cache 118a, 118b. The instruction cache 116a, 116b holds instructions from memory for execution, and the data cache 118a, 118b holds cached memory locations that are the operands of the instructions in the instruction cache. In response to instructions from the core 114a, 114b, the cache controller 115a, 115b performs operations on the cache 118a, 118b, such as adding cache entries and invalidating cache entries. In an implementation, a single cache, rather than the split cache may hold both instructions and data. Several levels of cache, such as level 2 and level 3, are possible, with each level in the hierarchy being one level further removed from the core. The data cache 118a, 118b is addressed by a virtual address. When higher level caches are present, the data in the higher level caches are addressed by real addresses. For this reason, the TLB 124 is located in the core to perform the virtual-to-real address translations.

Figure 2A:
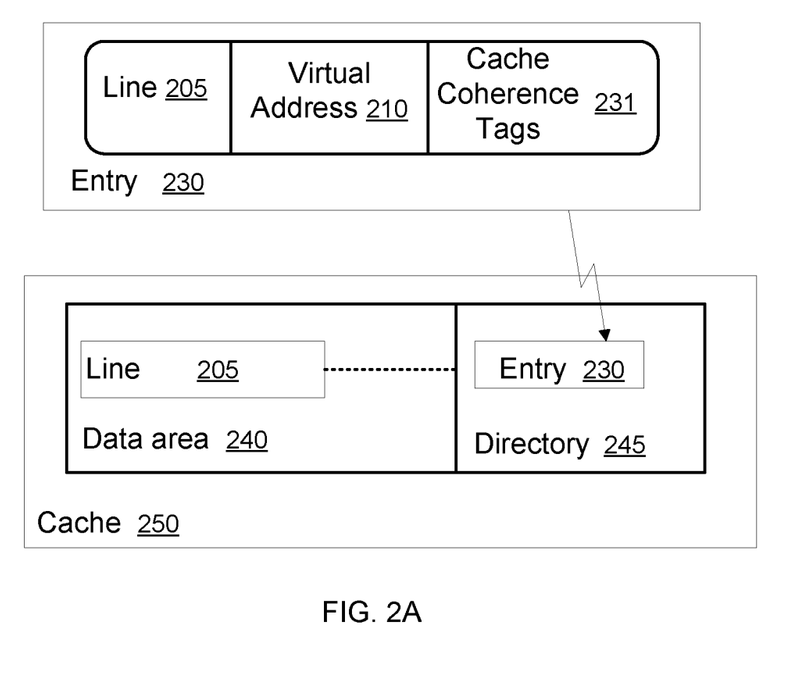
FIG. 2A depicts an exemplary cache structure.

Referring to FIG. 2A, the cache 250 includes a data area 240 and a directory 245 as well as various conflict management controls, such as cache coherence tags 231. Each cache line 205 in the data area 240 has a corresponding directory entry 230 in the directory 245. The directory entry 230 is used to determine if an addressed cache line is resident in the data area 240. The directory entry 230 includes a virtual address 210 for determining if an address has a hit in the data area 240.

Figure 2B:
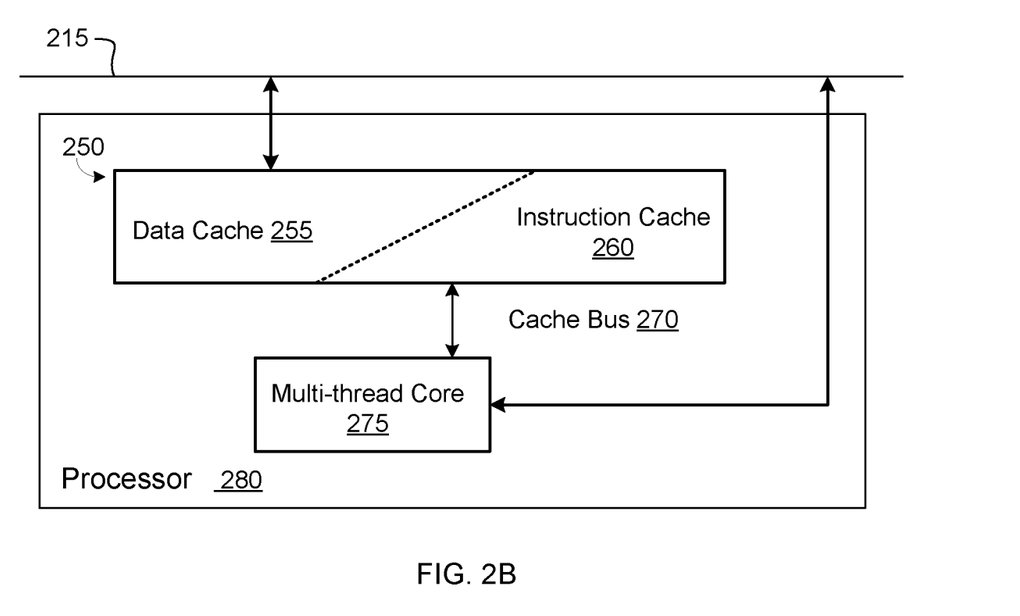
FIG. 2B depicts an exemplary processor and cache.

Referring to FIG. 2B, the processor 280 may include a multi-threaded core 275, and a cache bus 270 for communicating with the cache 250. The cache 250 may be a split cache having a data cache 255 and an instruction cache 260, or the cache 250 may have a unified cache including both data and instructions. The processor 280 may communicate with other processors and main store (not shown) over the system bus 215.

Figure 3:
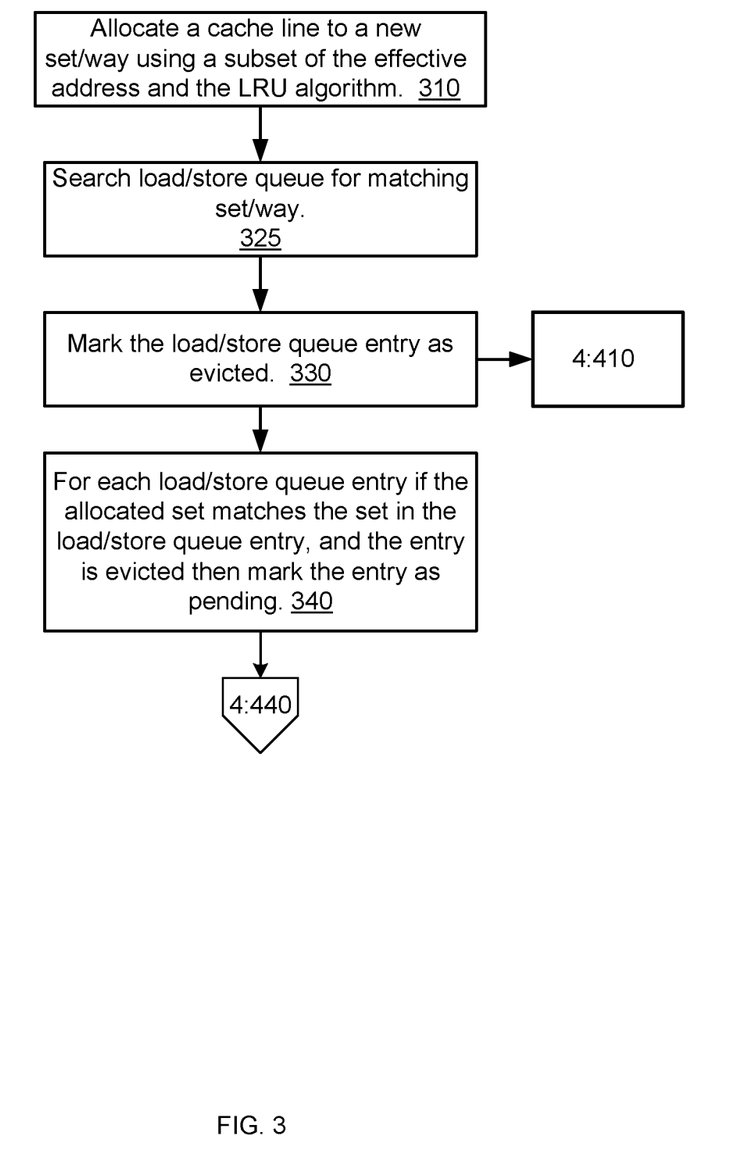
FIG. 3 is a flowchart of marking load/store entries with evicted cache.

FIG. 3 is a flowchart of marking load/store entries having evicted cache.

When a cache miss occurs and the cache is reloaded, the cache controller allocates a new set/way is allocated in the cache (310). The set is derived from a subset of the bits in the effective address. The way is based on a least recently used (LRU) algorithm. At 325, the LSU searches the load/store queue for a match on the new set/way. A match means the cache line that was being used has been overwritten. At 330, the LSU marks a bit in the load/store queue entry indicating that it was evicted. When the subsequent TLB invalidation process searches the cache (FIG. 4), these evicted load/store operations are imprecisely marked because the virtual address in the set/way of the cache the executing instruction was originally pointing to has been replaced by a different virtual address. Therefore, the TLB invalidation search will not find the original virtual address to mark it. In this case, for load/store operations marked as evicted, only the set is matched because it remains static. The way is ignored. (340)

Figure 4:
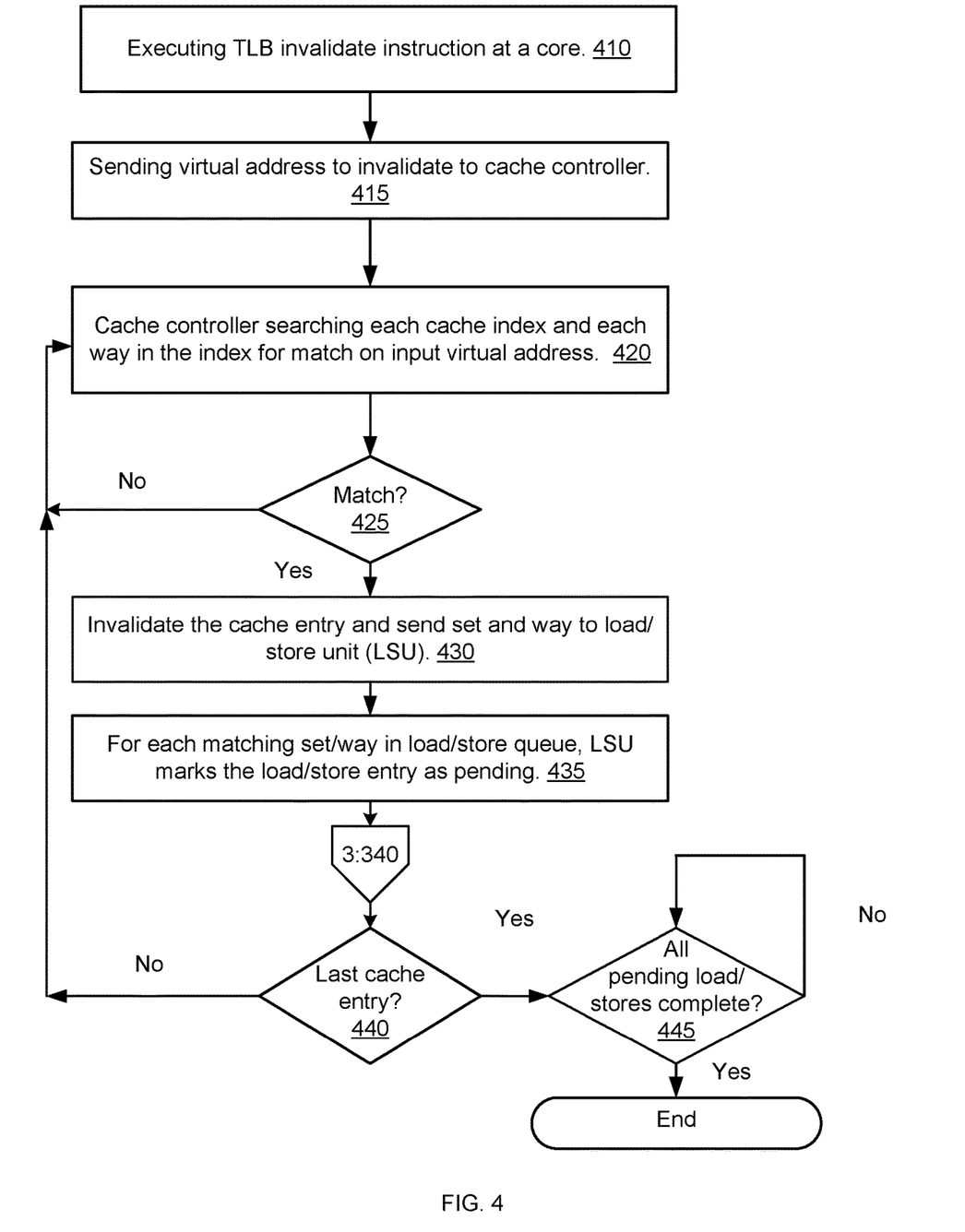
FIG. 4 is a flowchart of invalidating cache with virtual addresses.

FIG. 4 is a flowchart of a core invalidating cache with virtual addresses. Each core in the system responds to the broadcast of the TLB invalidate instruction in this manner.

At 410, the core receives a TLB invalidate instruction. At 415, the core sends the virtual address to the cache controller 115a, 115b with instructions to search the cache for a matching virtual address. At 420, the cache controller, 115b searches each index, i.e., set, and each way, i.e., each entry within the index for the 115a matching virtual address. If, at 425, a matching virtual address is not located in the particular index, the cache controller 115a, 115b, advances to the next index and begins to search each entry within the index. If, at 425, a matching virtual address is found, then at 430 the set/way in the cache 118a, 118b is marked as invalidated, and the virtual address and set/way are sent to LSU. At 435, the LSU searches the load/store queues to determine if there are any operations for the matching virtual address that should be marked as pending. If a match is found, the LSU marks the entry as pending. The process returns to FIG. 3 at 340 to mark as pending the load/store queue entries that are marked as evicted. For evicted load/store queue entries, only the set is used in the comparison. Using the virtual cache to mark load/store operations satisfies the ordering requirement without overmarking. Marking the load/store operation also ensures that remote cores are aware that they may be executing load/store operations on the address that is the target of the TLB invalidate instruction. At 440, if more sets and ways remain to search, the process returns to 420, where the next set and its ways are searched. However, if searching the cache is completed, then at 445 the load/store operations the LSU marked as pending are executed.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for translation lookaside buffer (TLB) invalidation, comprising:
   receiving a TLB invalidate instruction at a core of a plurality cores, wherein the TLB invalidate instruction includes an input virtual address to be invalidated;
   searching in a cache for a virtual address matching the input virtual address;
   based on a matching virtual address in the cache, invalidating the corresponding cache entry;
   searching a load/store queue for a set and a way corresponding to the set and the way of the invalidated cache entry;
   based on an entry in the load/store queue matching the set and the way of the invalidated cache entry, marking the entry in the load/store queue as pending; and
   delaying indicating a completion of the TLB invalidate instruction until all pending entries in the load/store queues are complete.

2. The method of claim 1, wherein:
   the set is an index into the cache and the way is an associativity.

3. The method of claim 1, wherein only the set is used when marking as pending the load/store queue entry of an evicted cache entry.

4. The method of claim 1, wherein a combined the set and the way in the load/store queue entry is a pointer to the cache line.

5. The method of claim 1, wherein the set is derived from a subset of an effective address.

6. The method of claim 1, further comprising:
   reloading a cache line in response to the cache line being previously evicted, wherein the reloading comprises allocating a new set and a new way;
   searching the load/store queue for an entry having a set and a way corresponding to the new set and the new way; and
   indicating in the load/store queue entry that the cache line in the load/store queue entry is evicted.

7. The method of claim 6, further comprising:
   marking the entry in the load/store queue as pending based on the entry in the load/store queue being evicted and having the set matching the new set.

8. A computer program product for translation lookaside buffer (TLB) invalidation, wherein the computer program product comprises a computer readable storage medium having program instructions embodied therewith, the program instructions executable by a processing unit to cause the processing unit to perform a method comprising:
   receiving a TLB invalidate instruction at a core of a plurality cores, wherein the TLB invalidate instruction includes an input virtual address to be invalidated;
   searching in a cache for a virtual address matching the input virtual address;
   based on a matching virtual address in the cache, invalidating the corresponding cache entry;
   searching a load/store queue for a set and a way corresponding to the set and the way of the invalidated cache entry;
   based on an entry in the load/store queue matching the set and the way of the invalidated cache entry, marking the entry in the load/store queue as pending; and
   delaying indicating a completion of the TLB invalidate instruction until all pending entries in the load/store queues are complete.

9. The computer program product of claim 8, wherein:
   the set is an index into the cache and the way is an associativity.

10. The computer program product of claim 8, wherein only the set is used when marking as pending the load/store queue entry of an evicted cache entry.

11. The computer program product of claim 8, wherein a combined the set and the way in the load/store queue entry is a pointer to the cache line.

12. The computer program product of claim 8, wherein the set is derived from a subset of an effective address.

13. The computer program product of claim 8, further comprising:
   reloading a cache line in response to the cache line being previously evicted, wherein the reloading comprises allocating a new set and a new way;
   searching the load/store queue for an entry having a set and a way corresponding to the new set and the new way; and
   indicating in the load/store queue entry that the cache line in the load/store queue entry is evicted.

14. The computer program product of claim 13, further comprising:
   marking the entry in the load/store queue as pending based on the entry in the load/store queue being evicted and having the set matching the new set.

15. A computer system for translation lookaside buffer (TLB) invalidation, comprising:
   one or more processors; and a computer-readable memory coupled to the one or more processors, the computer-readable memory comprising instructions for:
   searching in a cache for a virtual address matching the input virtual address;
   based on a matching virtual address in the cache, invalidating the corresponding cache entry;
   searching a load/store queue for a set and a way corresponding to the set and the way of the invalidated cache entry;

based on an entry in the load/store queue matching the set and the way of the invalidated cache entry, marking the entry in the load/store queue as pending; and delaying indicating a completion of the TLB invalidate instruction until all pending entries in the load/store queues are complete.

16. The computer system of claim 15, wherein:
the set is an index into the cache and the way is an associativity.

17. The computer system of claim 15, wherein only the set is used when marking as pending the load/store queue entry of an evicted cache entry.

18. The computer system of claim 15, wherein a combined the set and the way in the load/store queue entry is a pointer to the cache line, and wherein the set is derived from a subset of an effective address.

19. The computer system of claim 15, further comprising:
reloading a cache line in response to the cache line being previously evicted, wherein the reloading comprises allocating a new set and a new way;

searching the load/store queue for an entry having a set and a way corresponding to the new set and the new way; and indicating in the load/store queue entry that the cache line in the load/store queue entry is evicted.

20. The computer system of claim 19, further comprising:
marking the entry in the load/store queue as pending based on the entry in the load/store queue being evicted and having the set matching the new set.

* * * * *